United States Patent
Krishnaiah et al.

(10) Patent No.: US 12,093,661 B2
(45) Date of Patent: Sep. 17, 2024

(54) METHODS AND SYSTEMS FOR TRANSLATING PRODUCT OR SERVICE INFORMATION

(71) Applicant: Caterpillar Inc., Peoria, IL (US)

(72) Inventors: Manjunath P. Krishnaiah, Frisco, TX (US); Daniel E. Gabrielse, Grand Rapids, MI (US); Pradeep Maddineni, Wheaton, IL (US); Arunprasad Bagavatssing, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 349 days.

(21) Appl. No.: 17/542,179

(22) Filed: Dec. 3, 2021

(65) Prior Publication Data
US 2023/0177280 A1 Jun. 8, 2023

(51) Int. Cl.
*G06F 40/58* (2020.01)
*G06F 16/903* (2019.01)

(52) U.S. Cl.
CPC ........ *G06F 40/58* (2020.01); *G06F 16/90335* (2019.01)

(58) Field of Classification Search
None
See application file for complete search history.

(56) References Cited

U.S. PATENT DOCUMENTS

| | | | |
|---|---|---|---|
| 7,784,026 B1 | 8/2010 | Wong | |
| 8,412,510 B2 | 4/2013 | Zhou et al. | |
| 10,430,521 B2 | 10/2019 | Bestfleisch et al. | |
| 2007/0266024 A1* | 11/2007 | Cao | G06F 16/9537 |
| 2015/0142794 A1 | 5/2015 | Tebbenhoff et al. | |
| 2017/0177712 A1* | 6/2017 | Kopru | G06F 16/3337 |
| 2019/0370392 A1 | 12/2019 | Cazin et al. | |
| 2020/0371824 A1 | 11/2020 | Secomandi et al. | |

OTHER PUBLICATIONS

Written Opinion and International Search Report for Int'l. Patent Appln. No. PCT/US2022/050520, mailed Mar. 2, 2023 (9 pgs).

* cited by examiner

*Primary Examiner* — Nicole A K Schmieder (57) ABSTRACT

A technique is directed to methods and systems for translating product or service information. In some implementations, a translation system generates and stores translations of product or service information in a database to provide the translations to users. The translation system can perform a localization process to translate text and add locale-specific components of a specific region to the translation. The translation system can collect the user preferred language and provide translations to the user in the preferred language. In some implementations, the translation system receives a query for a product or service information translation and matches certain text characteristics in the query to characteristics in the database to determine a direct or approximate translation. Once a translation is determined, the translation system can output a notification to the user which includes the translated product or service information and any related information to the product or service.

20 Claims, 8 Drawing Sheets

METHODS AND SYSTEMS FOR TRANSLATING PRODUCT OR SERVICE INFORMATION

BACKGROUND

Companies can provide products and services to clients in multiple countries. As each country can have different languages of communication, information must be translated from the language of the company into the client's language. However, due to the differences in the meaning of words in each language and country, the information is often mistranslated even within a common language, such as English. For example, a transmission in an automobile in the USA is called a gearbox in England.

SUMMARY

In some embodiments, a method for translating equipment part item names, includes receiving a query of equipment part items based on an equipment part item request in a user interface, wherein the query is in a dialect of the user interface. The method can include identifying a localized version of the dialect based on geolocation data associated with the query. The method can further include filtering equipment part items in an equipment part platform based on the localized version of the dialect by: analyzing one or more equipment part items based on the query, translating names of the one or more equipment part items into the localized version of the dialect, identifying one or more equipment part item translations as results for the query based on a match between the translated names of the one or more equipment part items and the query of the equipment part items, and outputting, to the user interface, a notification of the identified one or more equipment part item translations including an equipment part number.

In some embodiments, a system for translating equipment part item names, includes receiving a query of equipment part items based on an equipment part item request in a user interface, wherein the query is in a dialect of the user interface. The system can include identifying a localized version of the dialect based on geolocation data associated with the query. The system can further include filtering equipment part items in an equipment part platform based on the localized version of the dialect by: analyzing one or more equipment part items based on the query, translating names of the one or more equipment part items into the localized version of the dialect, identifying one or more equipment part item translations as results for the query based on a match between the translated names of the one or more equipment part items and the query of the equipment part items, and outputting, to the user interface, a notification of the identified one or more equipment part item translations including an equipment part number.

In some embodiments, the system can further include one or more processors; and one or more memory devices having stored thereon instructions that when executed by the one or more processors cause the one or more processors to perform at least one of the following: (i) receive a query of equipment part items based on an equipment part item request in a user interface, wherein the query is in a dialect of the user interface; (ii) identify a localized version of the dialect based on geolocation data associated with the query; (iv) filter equipment part items in an equipment part platform based on the localized version of the dialect by: analyzing one or more equipment part items based on the query, translating names of the one or more equipment part items into the localized version of the dialect, and identifying one or more equipment part item translations as results for the query based on a match between the translated names of the one or more equipment part items and the query of the equipment part items; and (v) output, to the user interface, a notification of the identified one or more equipment part item translations including an equipment part number.

Other aspects will appear hereinafter. The features described herein can be used separately or together, or in various combinations of one or more of them.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for translating product or service information. Companies provide products and services (e.g., equipment, equipment parts, equipment information, manuals, technical documents, instruction information, etc.) to clients in different regions of the world. However, the clients in different countries can communicate in different languages (dialects) than the language of the company providing the products or services. Thus, there is a need, for a translation system to generate, update, and store translations of product or service information (data) in a database to provide to clients. Some languages have variations based on the local region. For example, the French language can include variations such as, Metropolitan French, Meridional French, Quebec French, Acadian French, Swiss French, Belgian French, etc. Each variation can apply different interpretations/meanings to words, which can result in translation errors. The translation errors can cause the wrong product or service to get selected and delivered to a user. For example, when translating the word Excavator (e.g., type of construction machinery), the literal translation in Italian can be translated as "digger" which may cause the wrong equipment to be selected when an Italian user requests information or parts about the excavator.

The translation system can include a software application in a platform that adapts to various languages and regions.

The translation system can perform a localization process to translate text and add locale-specific components of a specific region or language. Language localization can enable cultural and regional scripts to present to the end user, to maximize the user's ability to understand and act upon the data presented from the platform. The translation system can collect the language of the user from a user preference entered in a user interface or by determining the language based on the user's geographical information (e.g., location of the user, delivery location of the product or service, etc.). The translation system can present applications in the user interface in the local language of the user. In some implementations, the translation system can provide translations in all the languages supported by the platform. In some cases, if translations are not available for a specific language, the platform can default to specified default language (e.g., USA-English).

In some implementations, the translation system receives a query for a product or service (e.g., equipment parts, equipment information, manuals, etc.) from a user and identifies the language or localized version of the language for the translation. The translation system can match certain objects/properties in the query to other phases/terms in the database to determine a direct or approximate translation of the product or service requested by the user. Once a translation is determined, the translation system can output a notification to the user which includes the translated product or service name and any related information to the product or service.

Figure 1:
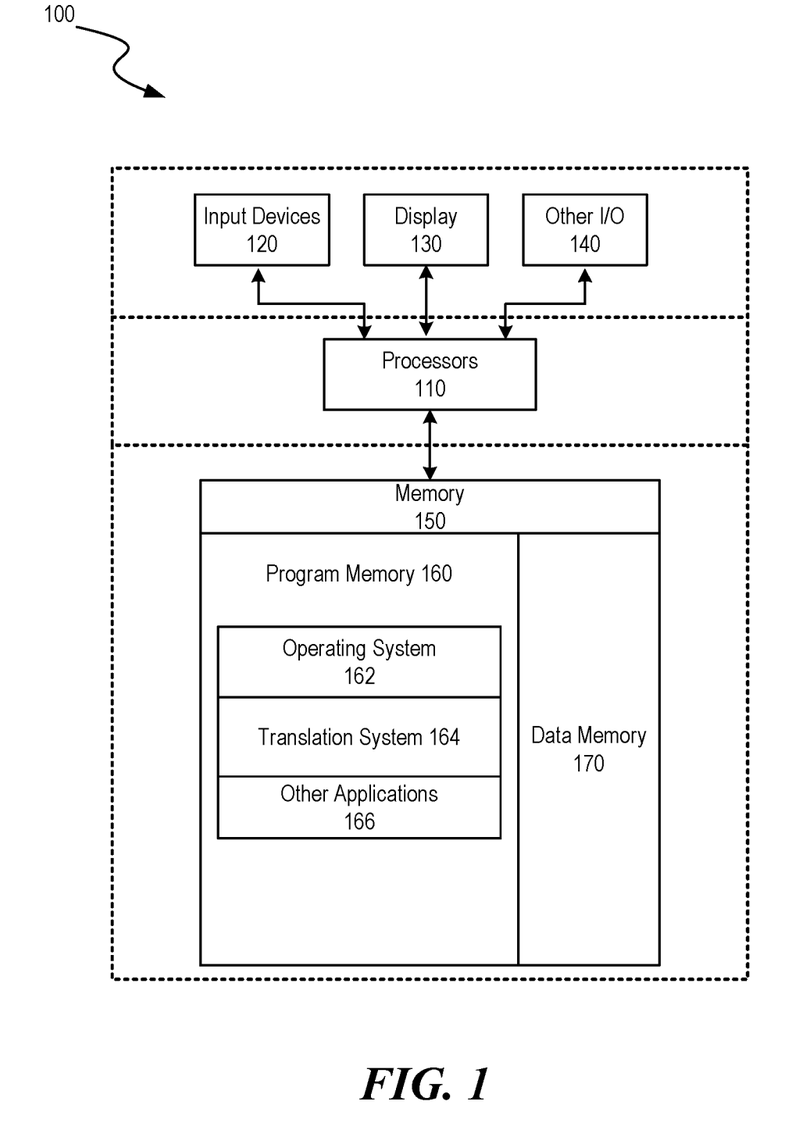
FIG. 1 is a block diagram illustrating an overview of devices on which some implementations can operate.

Several implementations are discussed below in more detail in reference to the figures. FIG. 1 is a block diagram illustrating an overview of devices on which some implementations of the disclosed technology can operate. The devices can comprise hardware components of a device 100 that manage entitlements within a real-time telemetry system. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, translation system 164, and other application programs 166. Memory 150 can also include data memory 170, translation data, dialect data, user data, retrieval data, management data, authorization token data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
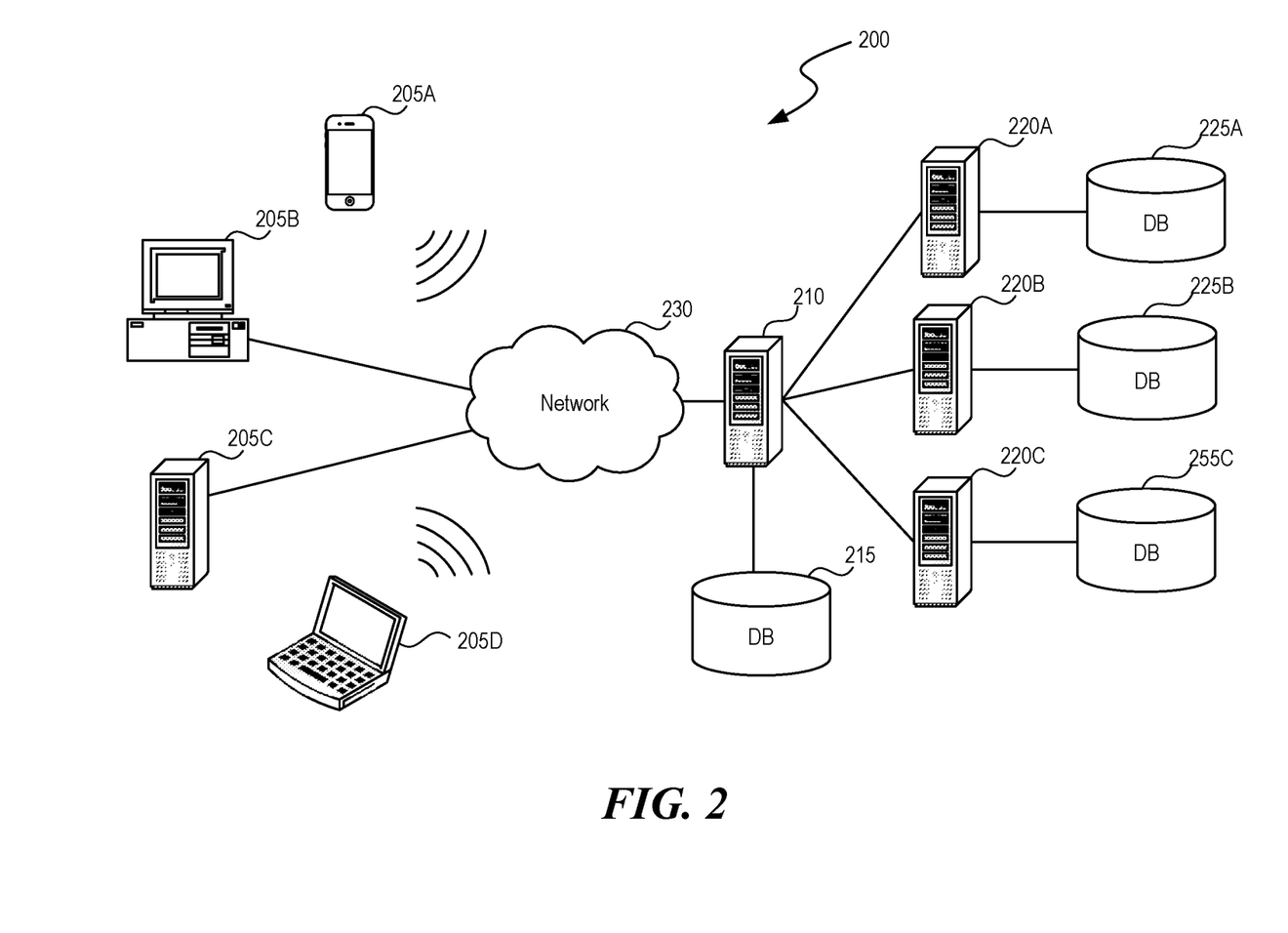
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as dialect data, language preference data, user data, machine-learning data, equipment part data, and notification data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
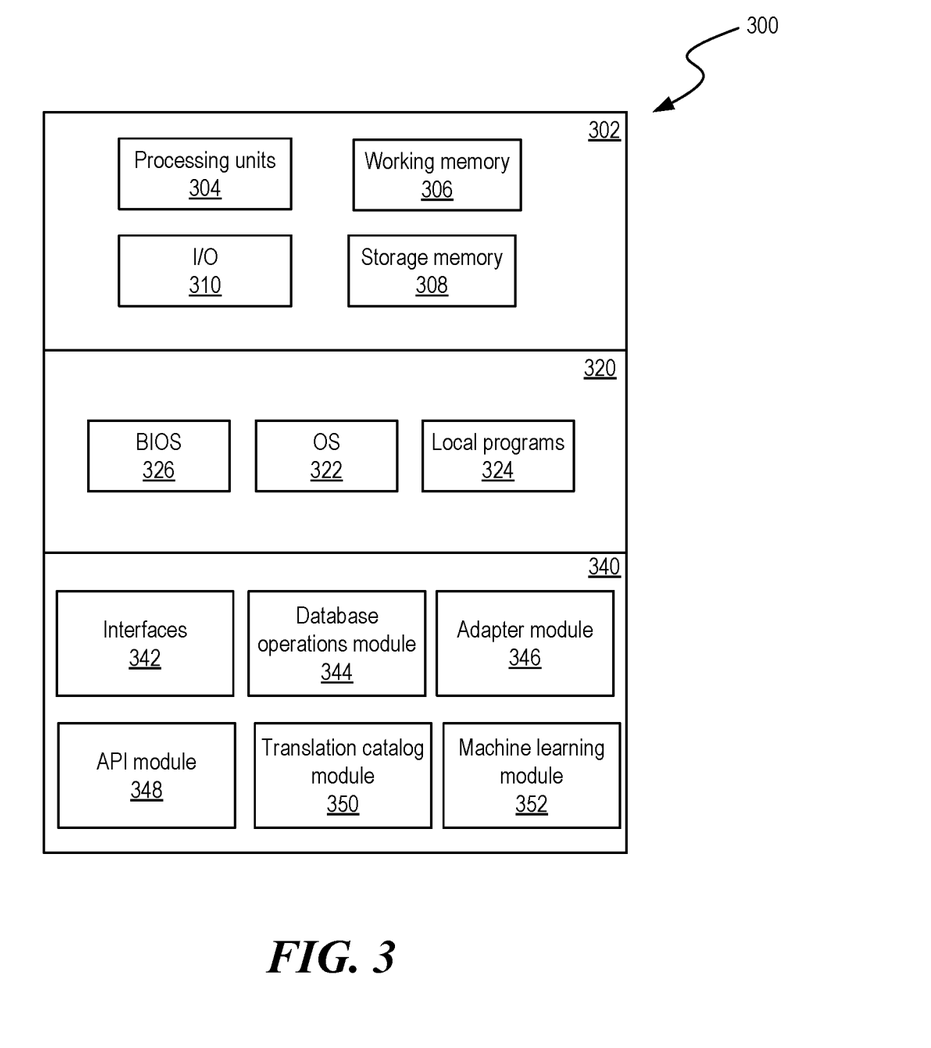
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include database operations module 344, adapter module 346, API module 348, translation catalog module 350, machine learning module 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some embodiments, the database operations module 344 is configured to store the translations within each datastore and leverage the capabilities provided by the datastore to return translated values based on user preferences (e.g., using user preferences as the mechanism for determining the language to be projected from the service, and identifying the user input to be the user's language). The database operations module 344 can store the translations in a database along with the data. A language lookup table can be added to the database, that contains a foreign key relationship to a master table, along with the addition of a language code. This can be generalized to a single table with all known translations. When retrieving content from the table, the query can be augmented to include an additional join, along with the required language field (e.g., serial number, manufacturer code, product family, etc.). The join can be performed on all fields where translatable, thus creating additional load on the database retrieval. Each event record is duplicated and stored in each of the languages supported by the prescribed solution. The database operations module 344 can include "language" as a filter criterion and return the results in user's preferred locale language. The database operations module 344 can execute the filter operations and sort operations at the database level. The input values are converted to the APIs standard frame of reference when executing filtering operations. For instance, a user may specify a distance value in 'm' whereas the database could be storing the value in 'km'.

In some embodiments, the adapter module 346 is configured to maintain data in US English (or any default language) and the API can emit non-localized data. In some cases, a generated response to a query is translated, converted and formatted as needed before returning to the consumer. The adapter module 346 can retrieve translations using the translation API rather than storing it in the service specific datastore. The adapter module 346 can implement an adapter layer which transforms the operation on localizable data to an equivalent operation on non-localized data. In an example of "Product Family" (e.g., "Lift Trucks", "Track-Type Tractor", Backhoe Loaders, etc.) which is presumed to be a translatable data field in the platform and that such translatable fields are generally pre-defined enumerated list of values, each value can be assigned a fixed code that is agnostic of any locale (illustrated in table 1), such as the master data for type "Product Family".

TABLE 1

| Code | Description |
| --- | --- |
| 01 | TRACK-TYPE TRACTORS |
| 03 | LIFT TRUCKS |
| 08 | BACKHOE LOADERS |

From the above master data, adapter module 346 can derive a lookup table providing translated descriptions for each code (illustrated in table 2).

TABLE 2

| Code | Locale | Description |
| --- | --- | --- |
| 01 | en | TRACK-TYPE TRACTORS |
| 03 | en | LIFT TRUCKS |
| 08 | en | BACKHOE LOADERS |
| 01 | fr | TRACTEURS Á CHAÎNES |
| 03 | fr | CHARIOTS ÉLÉVATEURS |
| 08 | fr | CHARGEUSES-PELLETEUSES |

The adapter module 346 can perform filtering and searching directly in the database using inputs that are specified in user's local language or remap input values into standard predefined enumerated codes, in order to use the input as filter criteria in the database. The adapter module 346 can perform "Unit of Measures" conversions, to convert the user input values to the measurement systems used by the API and vice versa for output from the API. In some cases, the underlying API does not support localization, and the API returns the entire result set of the query without applying any pagination, sorting or filtering operations. The result set is loaded into the memory of the adapter and computations are applied on the data and the final output is rendered.

In some embodiments, the API module 348 is configured to present data (e.g., equipment, parts, equipment information, manuals, etc.) in units of measure appropriate to the country and/or user choice. The API module 348 can perform localization formatting according to the end-user preference/requirements. These requirements dictate how data is shaped for local convention. This includes date format, numeric values, currency, etc. The values in the translation system can be stored in metric system units of measurement. The scale of unit of measurement (meters vs. kilometers, seconds vs. hours, etc.) can be variable by field (e.g., selected per individual field). In some cases, the precision of a translation is variable by field. The API module 348 can provide and accept data (from users) in the metric system or any measurement system. In a centralized control platform, the server-side is a controllable environment, producing predictable results. In a shared logic platform, a standardized conversion code is shared between services and endpoints further reducing risk of mistakes. In a preference control platform, the API module 348 can apply user preference changes throughout the platform. The API module 348 can monitor the unit of measure during data ingestion. Any input mechanism (i.e. API, etc.,) that accepts values with unit of measure can perform the following: accept values in metric units and implement validation to ensure a client provides values in metric units or accept values in any of the predefined acceptable units of measurement and convert the value into the platform's standard storage format.

The API module 348 can perform conversions according to a user preference and can accept/render numerical values in a canonical format. The API module 348 can publish acceptable units of measures, such as a predefined list of units of measures will be published to consumer applications. On export, API module 348 can perform conversion and formatting according to user settings. In order to generate the exported content, the API module 348 can convert the unit of measure using the user preferences as defined in a user profile in the platform. The API module 348 will also apply necessary localized formatting based on the region.

In some embodiments, the translation catalog module 350 is configured to maintain a catalog of translations. The translation catalog module 350 can include all translation sources and provide provision to scope items (e.g., equipment part items) to specific name spaces (e.g., an API defines translations that are specific to its domain so that the names do not conflict with other translations in the catalog). The translation catalog module 350 can identify items in the catalog that require translation and initiate a request to the translation provider. The translation process can be an ongoing process, which incrementally identifies newly added items or untranslated items in the catalog which need to be translated. The translation catalog module 350 can merge the response from the translation provider to the translation master database. In some implementations, the translation catalog module 350 can provide a mechanism to obtain translation for all data fields in the catalog in all dialects/languages. The translations can be sourced through an enterprise gateway or sourced for data fields authored in a third-party system. For data fields authored within the translation system (or platform) the data fields can be translated periodically or continuously. The translations can be volatile to ensure that translation changes are kept up to date in a master database. The translation catalog module 350 can provide the mechanism to map the master translation database to other platform components, and ensure the other platforms are always synchronized with the master database.

In some embodiments, the machine learning module 352 is configured to analyze items (e.g., products or services, equipment part items, etc.) and provide a translation of the item name in a dialect (e.g., language such as, English, French German, Italian, etc.) or localized version of the dialect (e.g., localized versions of Italian such as Tuscan, Sicilian, Neapolitan, Venetian, Ligurian, etc.) The machine learning module 352 may be configured to identify translated items based on at least one machine-learning algorithm trained on at least one dataset reflecting translated items. The at least one machine-learning algorithms (and models) may be stored locally at databases and/or externally at databases. Client devices may be equipped to access these machine learning algorithms and intelligently identify and translate item names based on at least one machine-learning model that is trained on a dataset of translated item names. For example, if equipment part item names are translated into Italian and localized versions of Italian, those translated items may be collected to train a machine-learning model to then automatically translate equipment part items into Italian and localized versions of Italian.

As described herein, a machine-learning (ML) model may refer to a predictive or statistical utility or program that may be used to determine a probability distribution over one or more-character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process translated item name databases and other data stores to determine accurate translations of item names in all dialects and localized versions of dialects. Determining to translate an item name may comprise identifying the item was requested in a geographical location or identifying the item is currently only listed in a single language. For instance, if a user, speaks/reads in a dialect (e.g., Sicilian version of Italian) and is browsing for equipment parts, then the translation system described herein may determine to translate all the equipment part item names into the dialect of the user. Based on an aggregation of data from translated item name databases and platforms, item catalogs, and other user data stores, at least one ML model may be trained and subsequently deployed to automatically identify and translate item names into dialects of the users or into all dialects of viewers of the items (e.g., customers buying equipment or equipment parts). The trained ML model may be deployed to one or more devices. As a specific example, an instance of a trained ML model may be deployed to a server device and to a client device. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with item information, such as equipment or equipment part information. In such examples, the ML model may be locally cached by the client device.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
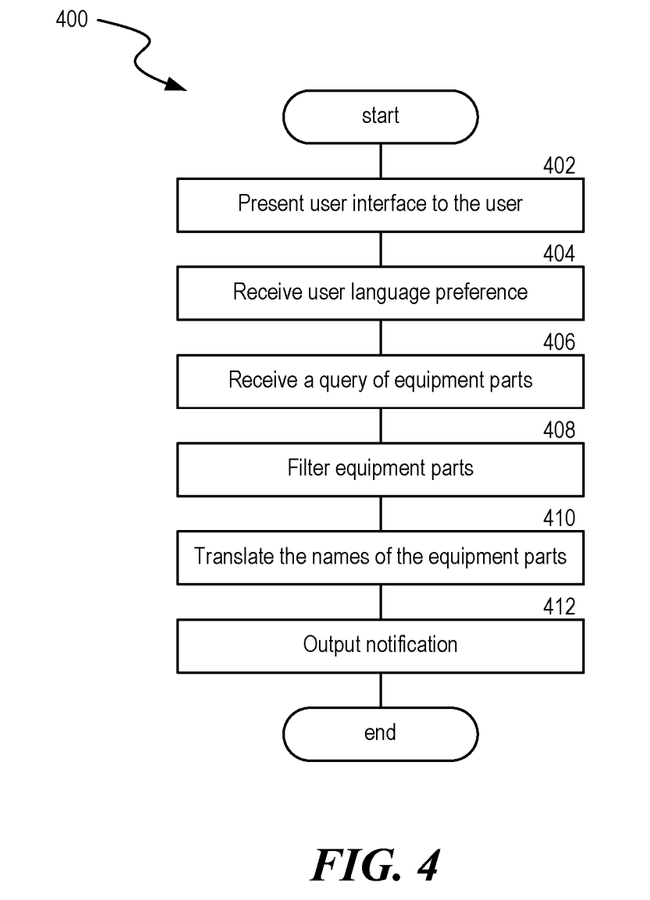
FIG. 4 is a flow diagram illustrating a process used in some implementations for translating product or service information.

FIG. 4 is a flow diagram illustrating a process 400 used in some implementations of the present technology for translating product or service information. Process 400 can be initially performed when a user requests a product or service information translation. Alternatively, or in addition, process 400 can be performed to update an existing company database (e.g. periodically, such as daily, weekly, etc.), when a user requests a translation of information, when a company updates an inventory of products or services, or process 400 can receive data pushed to it from the various data sources as the data sources are updated. In various implementations, process 400 can be performed locally on the user device or performed by cloud-based device(s) that can support product or service information translations.

At step 402, process 400 can present a user interface to the user. In some implementations, process 400 can interact with the user via the user interface. The user can access the user interface via an application or web browser on a user device, through a mobile or other application, etc. The user can receive the user interface when registering for the product or service translation system. Users can access platform data through the user interface or through other channels (e.g., emails, SMS messages, data export, APIs, etc.) Irrespective of the channel through which the user receives the content, localizable data values and predefined text used in these channels can be localized as per user preferences.

At step 404, process 400 can receive a user language preference. The user can select a language preference to view and select/order a service or product, such as equipment parts. The user can also select the language to translate a product or service name into. The language preference can include any dialect (e.g., English, mandarin, Russian, Italian, French, Spanish, Japanese, etc.) or any localized version of the dialect. The localized version of the dialect can include a variation of the dialect based on a geographical area of a country. For example, in Italy, Italian is the dialect but in certain geographical regions localized versions of Italian are used, such as Tuscan, Sicilian, Neapolitan, Venetian, or Ligurian. Process 400 can display the products or services in the user interface in the language of preference of the user. In some implementations, process 400 identifies the localized version of the dialect based on the geolocation data (e.g., GPS, location information, etc.) associated with the user device, the user profile, or the user language preference.

At step 406, process 400 can receive a query of a product or service, such as equipment part items, by a user submitting a request in the user interface. The request can include the language the user wants the product or service information translated into. For example, a user requests the Sicilian Italian translation of an English name of an equipment part. At step 408, process 400 can filter products or services in a product or service translation platform based on the query. Process 400 can analyze all the product or service translations to find a mapping to the product or service in the dialect, or localized version of the dialect, that the user requested in the query.

At step 410, process 400 can translate the information (e.g., names, description, etc.) of the products or services into the language of the user (e.g., localized version of the dialect selected by the user). Process 400 can identify a product or service translation to select for the user based on a match between the product or service in the query and the translated names of the product or services in the product and service platform. For example, process 400 selects a product or service with a match above a threshold value, or when the match is a complete match. Process 400 can determine a complete match based on a previous product or service translations and user feedback confirming the translation resulted in the correct product or service the user requested. In some implementations, the match is based on the criteria associated with the product or service. For example, if a hydraulic hose is requested, and the resulting translated name is a hose for hydraulic fluid, the match is a complete match because the result is what the user requested. Process 400 can select the translation using a lookup table as described in FIGS. 3 and 7. Process 400 can match certain objects/properties and/or phases/terms of the user query to the lookup table to determine an actual map for a direct translation or an approximate translation.

At step 412, process 400 can output a notification to the user on the user interface. The notification can include the translated information of the product or service, such as the translated equipment part name, an equipment part number, variations of the product or service name translated into the selected language. In some cases, if a direct translation is not determined, process 400 can present the user with a list of related translations for the user to select from. In some implementations, process 400 can perform a search to identify untranslated product or service information in a database and translate the product or service information into all the languages associated with the database. For example, a company can maintain translations of all product or service information (e.g., names, descriptions, product numbers, equipment part numbers, identification numbers, etc.) in any or all the languages of current customers or potential customers. Process 400 can provide translations in all the languages supported by the platform. If the platform is delegated to source missing translations it can optionally do so. If translations are not available for a specified language, the platform can default to a default language such as "US-English".

Figure 5:
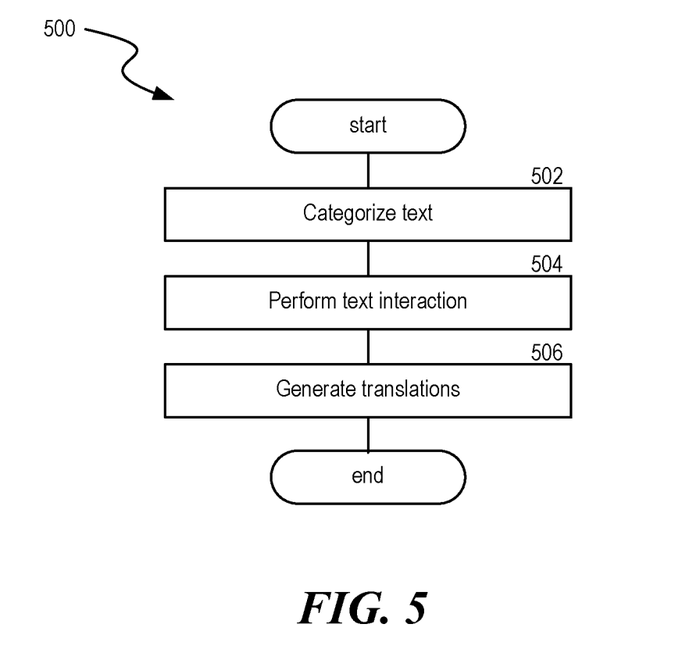
FIG. 5 is a flow diagram illustrating a process used in some implementations for generating translations of product or service information.

FIG. 5 is a flow diagram illustrating a process 500 used in some implementations for generating translations of product or service information. Process 500 can be initially performed when a user requests a product or service information translation. Alternatively, or in addition, process 500 can be performed to update an existing company database (e.g. periodically, such as daily, weekly, etc.), when a user requests a translation, when a company updates an inventory of products or services, or process 500 can receive data pushed to it from the various data sources as the data sources are updated. In various implementations, process 500 can be performed locally on the user device or performed by cloud-based device(s) that can support product or service information translations.

At step 502, process 500 can categorize text (e.g., product or service information) hosted in a platform, such as a server platform (e.g., Helios™ platform), or a corporate directory service. Process 500 can categorize text using definitions. Examples of definitions include predefined text, application managed text, platform managed text, adhoc text, and platform generated text. Predefined text can include any text library that is defined at design-time (e.g., structured text with a definition), and thus can be translated formally by a platform. Application managed text can include application-specific field names, notations, and descriptions that provide context to the user. These values are not always determined by the platform per se but may be recommended by the platform for user experience consistency across a digital space. For example, applications present consistent values through all digital properties, to maintain a consistent user experience (e.g., presenting the local language of the user for all platform-sourced text). Platform managed text can include any structured text that is ingested into the platform from the canonical source or managed within the platform as an owned data element. Within the platform, the text can be codified within a given data domain and be identified within the data domain with some unique identifier. It is possible for the domain-specific unique identifier to be defined by the business, or within the Platform. Adhoc text can include any text generated in an ad-hoc user-interactive session. This can be end user generated data captured by a client device of the platform, or user interaction upstream data of the platform. An example of upstream data would be interpretation text within an SOS fluids system: while the data is captured by the platform from an enterprise system, it is sourced originally from an interactive user session. Platform generated text can include any transaction or content that is generated by the platform, and consumed by an external agent, where traceability to the original record is required. Text can be considered static once it is emitted from the platform.

Process 500 can categorize platform managed text based on the categories of text (e.g., enumerated list values, structured text, or error messages). Enumerated list values can include a display used in an isolated use case. That is, the value is typically a header in a column, or a standalone value in a table cell. Examples can include Product Family ("Large Wheel Loader", "Track-Type Tractor", etc.) or SOS overall interpretation (AR="Action Required", NAR="No Action Required", etc.). The Enumerated list can be identified with some [alpha-]numeric value, along with a textual description. The identifier can be domain-specific to the enumerated list. The structured text can include structured predefined static text that is used to generate artifacts, such as emails, SMS messages, push notifications etc. Error messages can include messages generated by the platform for a user, such as a software developer.

In an example of the structural mode control system (SMCS) coding structure, the SMCS coding structure has different categories of data (e.g., component, job, modifier, etc.), each of which contains multi-part values. An example of a job code is illustrated in table 3. In the case of the SMCS Job Code, the "Description" can be classified as an Enumerated List entry and "Definition" can be classified as a separate Enumerated List entry. In both cases, the "Job Code" can be the identifier of the value.

TABLE 3

| Job Code | Description | Definition |
|---|---|---|
| 007 | RECONDITION AFTER FAILURE | USED FOR CALCULATOR APPLICATION. TO REBUILD OR RESTORE AN INOPERABLE COMPONENT TO LIKE NEW CONDITION AFTER THE COMPONENT HAS FAILED OR BEEN DAMAGED. FOR QUOTING PURPOSES ONLY. |
| 010 | REMOVE & INSTALL | DETACH AND ATTACH OR SET IN POSITION AND PREPARE FOR USE. THE REMOVAL OF A COMPONENT FOLLOWED BY A SUBSEQUENT REINSTALLATION OF THE COMPONENT. INCLUDES REMOVING, DISCONNECTING, REINSTALLING, CONNECTING, ADJUSTING AND OTHER ACTIVITIES WHICH ARE CONSIDERED A NORMAL PART OF THE JOB. |
| 023 | REPAIR | TO RESTORE TO OPERATING CONDITION. USE WHEN THERE IS NO SPECIFIC JOB CODE THAT DEFINES THE SPECIFIC WORK BEING PERFORMED. |

At step 504, process 500 can perform text interaction. Text interaction can be split in several categories such as API output, search criteria, and export and notifications. API output can output translations of platform sourced data (e.g., enumerated list values, structured text, etc.). Process 500 can determine the user's preferred language before surfacing a locale-specific translation. The user can enter the language preference into a user interface (e.g., language setting, selection, etc.). In some cases, a given string within a domain has an internal identifier, such that explicit reference to the string can be identified. All script that is displayed on the screen and is sourced from a system API can be considered in scope for translation. For example, in the search criteria (or attribute) of Product Family, there is an expectation that this value be translated, as "Motor Grader" which is not a helpful description in a French speaking locale, where the correct value would be "Niveleuses". In some implementations, the user can override the attribute and substitute in their own. For example, the system translated value is not presented, regardless of locale/preference of the end user.

In the search criteria category, a user's interaction with an application can involve searching or filtering the content on the screen via user entry on the user interface. In enumeration filter criteria, an explicit item is used for exact match, such as an enumerated list value. The value can target a specific column with a known set of values. In free-form text criteria, a set of tokens generated by the user are used for the search. The value (in the user's language) can be word fragments or several words. Depending on the use case, values can be used against any column in the record. In an example using Product Family as illustrative of the search criteria, a sample of a Product Family translation, with the English and the French translation, as determined by the Service Data group is shown in Table 4.

TABLE 4

| SMCS_CD | English | French Translation |
|---|---|---|
| 01 | TRACK-TYPE TRACTORS | TRACTEURS À CHAÎNES |
| 03 | LIFT TRUCKS | CHARIOTS ÉLÉVATEURS |
| 04 | TRACK-TYPE LOADERS | CHARGEUSES À CHAÎNES |
| 06 | FOREST PRODUCTS | MATÉRIEL FORESTIER |
| 07 | EXCAVATORS | PELLES HYDRAULIQUES |
| 08 | BACKHOE LOADERS | CHARGEUSES-PELLETEUSES |
| 09 | TELESCOPIC HANDLERS | CHARGEURS TÉLESCOPIQUES |
| 10 | WHEEL LOADERS/ITC | CHARGEUSES SUR PNEUS/CHARGEUSES INDUSTRIELLES |
| 11 | SKID STEER LOADERS | CHARGEURS COMPACTS RIGIDES |

Within an application where assets are displayed, the user can filter using a pic-list or chips. The filter implementation can search for the exact item in the list. As described above, the value can have a domain and value identifier. By performing a filter on the explicit identifier, the application can be assured that the exact match is employed in the filter criteria. For example, by selecting from the list "CHARGEUSES À CHAÎNES", it is expected that a filter criterion, on the Product Family, will be performed against SMCS_CD="04". This precision ensures that there is not ambiguity in the result set. The application can support free-form text search, with the expectation that the value reflects on the Product Family, in the user's local language. In some cases, a partial word match is considered. For example, if a user provided a search phrase "Chargeu", there is an expectation that there would be many matches (04, 08, 09, 10, 11) to be considered in the results.

In the export and notifications category, the platform can perform exports of large sets of content. This includes the template-style content that is exported in response to a user request, as well as system-generated notification activities. In an export, two data concepts (e.g., platform data and context data) can be merged into a single medium. In some exports, there will be strings of text built into the output that provide the user with contextual information. In some cases, the text is stored in a language-specific template.

Figure 6:
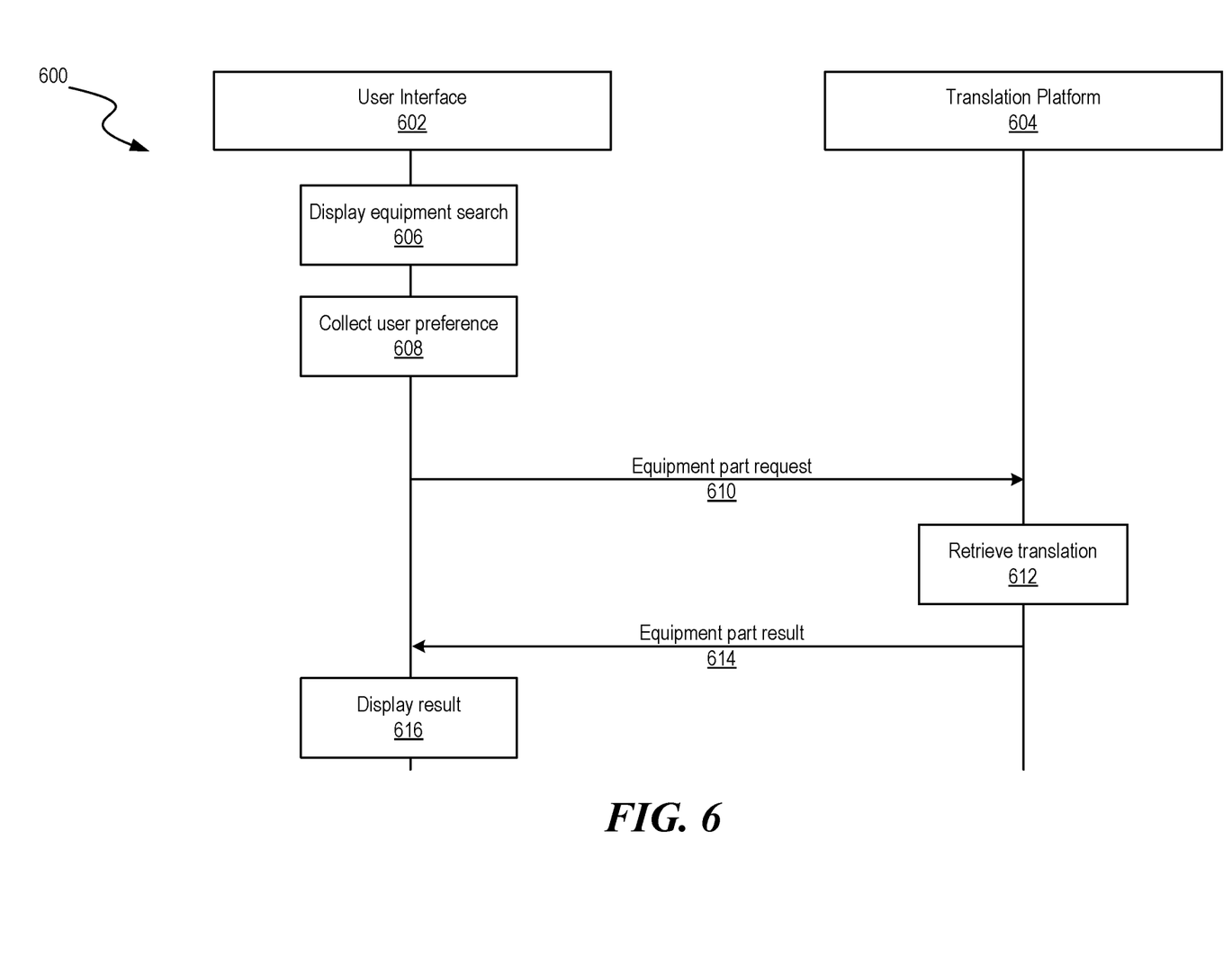
FIG. 6 is a conceptual diagram illustrating an example of a translation system dataflow.

At step 506, process 500 can generate translations of texts (e.g., equipment part names) in all languages and localized versions of the languages. Process 500 can translate a source word or phrase in different ways depending on how/when/where the phrase is applied. A given word could have multiple translations within a given library. In some cases, the translations are domain and/or context specific. Process 500 can provide translations in all the languages supported by the translation system. If translations are not available for the requested language, the platform can default to "US-English" values or any default language. Process 500 can leverage predefined translations authored for the domain, when translating a text. In some cases, the information supported by the platform includes technical jargon that may or may not be able to span multiple domains. Given these cases, each API can have pre-assigned translated values, with clear ownership assigned, such that the user can receive an accurate and precise translation. Process 500 can generate the translation of the text in a user preferred language. The source word or phrase can be translated in different ways depending on how/when/where the phrase is applied. A given word could have multiple translations within a given library FIG. 6 is a conceptual diagram illustrating an example 600 of translation system dataflow. At step 606, a user interface 602 (e.g., running a client application, such as an equipment parts application) can display equipment and/or an equipment parts search. At step 608, the user interface 602 can collect a user language preference. The language preference can include the language to display content/text, such as equipment part names, in the user interface 602. At step 610, the user interface 602 can send a data request/query, such as an equipment part request, to the translation platform 604 (e.g., with a data API). The request can include equipment or equipment parts associated with a customer order. At step 612, the translation platform 604 can retrieve a translation of the user request, such as the equipment parts translated into the user preferred language (e.g., Italian, French, English, etc.). At step 614, the translation platform 604 can send the translated result (e.g., translated equipment part names) to the user interface 602. At step 616, the user interface 602 can display the translated results to the user.

Figure 7:
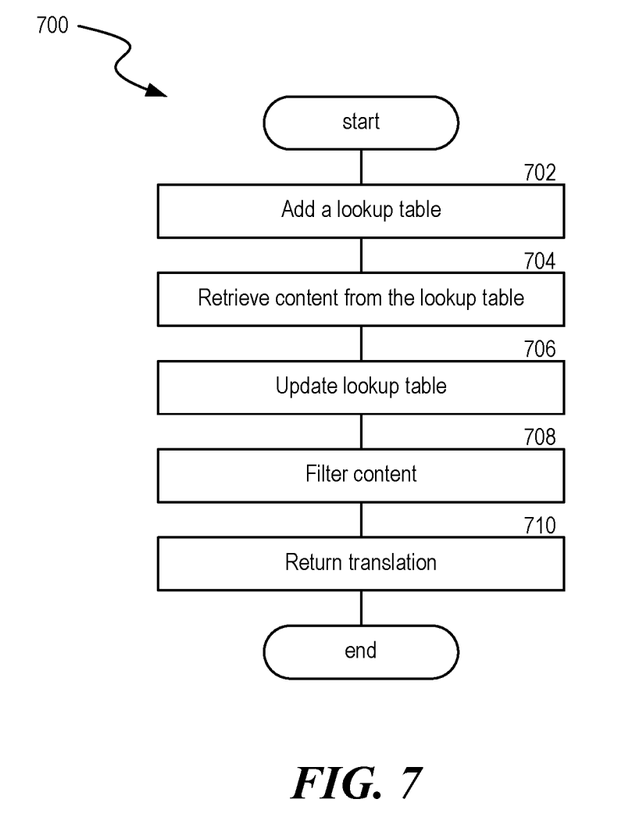
FIG. 7 is a flow diagram illustrating a process used in some implementations for retrieving translated product or service information.

FIG. 7 is a flow diagram illustrating a process 700 used in some implementations for retrieving translated product or service information. Process 700 can be initially performed when a user requests a product or service information translation. Alternatively, or in addition, process 700 can be performed to update an existing company database (e.g. periodically, such as daily, weekly, etc.), when a user requests a translation, when a company updates an inventory of products or services, or process 700 can receive data pushed to it from the various data sources as the data sources are updated. In various implementations, process 700 can be performed locally on the user device or performed by cloud-based device(s) that can support product or service information translations.

Users can access platform data through a user interface display or non-user interface channels (e.g., emails, SMS messages, data export, APIs, etc.) Irrespective of the channel through which the user receives the content, localizable data values and predefined text used in these channels can be localized as per user preferences. Process 700 can receive a request for a translation from a user. At step 702, process 700 can add a language lookup table to the database. The lookup table can contain a foreign key relationship to a master table, along with the addition of a language code. In some cases, the lookup table is a single table with all known translations. Process 700 can derive a lookup table by providing translated descriptions for each language code.

At step 704, process 700 can retrieve content from the lookup table by a query. The query can be augmented to include an additional join, along with the required language field (e.g., serial number, manufacturer code, product family, etc.). The join can be performed on all fields where translatable (e.g., creating additional load on the database retrieval). Each event record is duplicated and stored in each of the languages supported by the platform. At step 706, process 700 can update lookup table by storing the translated data in each of the languages supported by the platform. Process 700 can update the lookup table periodically (e.g., hourly, daily, weekly, etc.) or when a new translation is generated.

At step 708, process 700 can filter the translated content. In some implementations, "language" is a filter criterion and process 700 returns the results in user's preferred locale language. Process 700 can execute the filter operations and sort operations at the database level. The input values are converted to the APIs standard frame of reference when executing filtering operations. For instance, a user may specify a distance value in 'm' whereas the database could be storing the value in 'km'. At step 710, process 700 can return a translation to the user interface in the language the user has selected.

Figure 8:
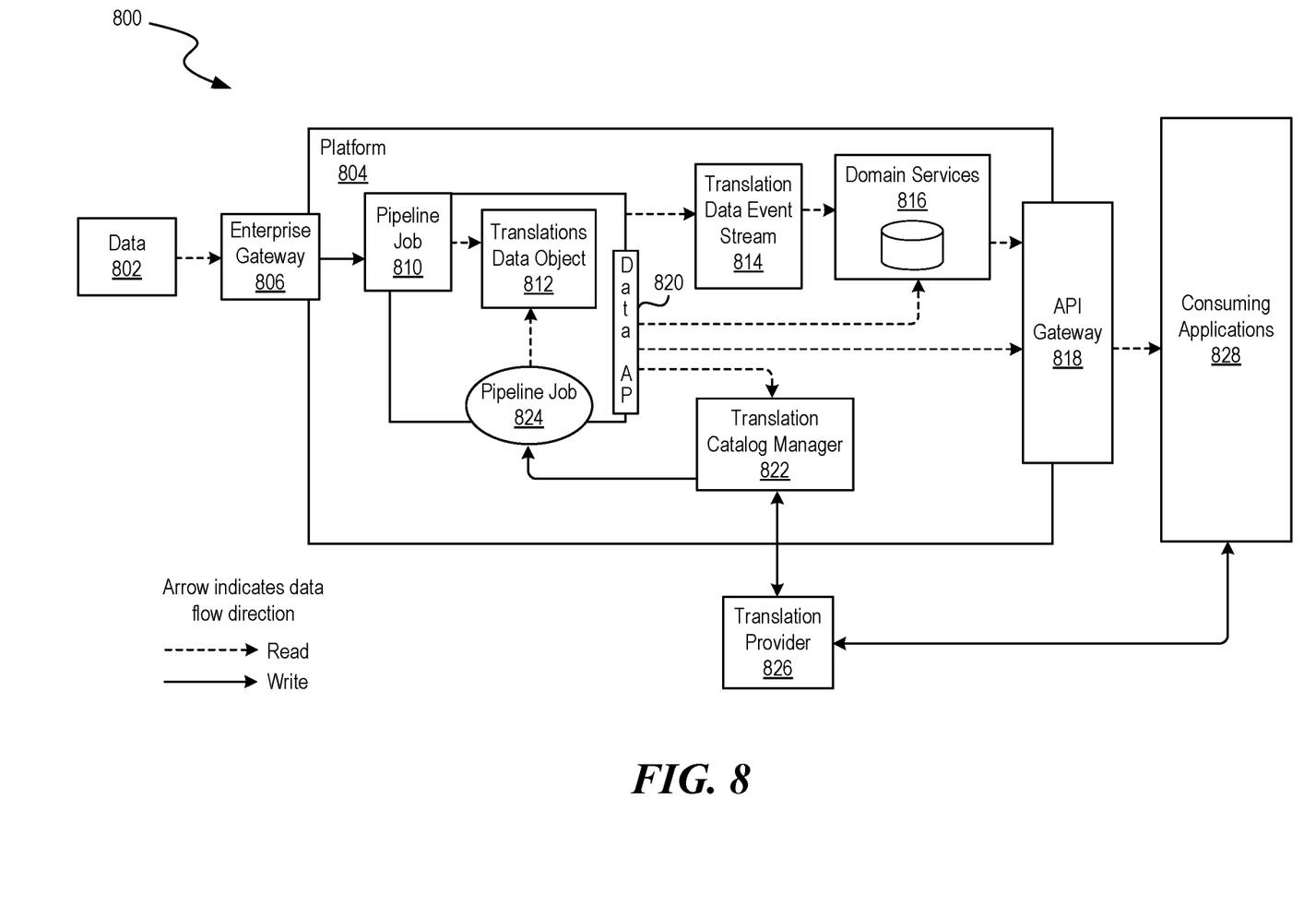
FIG. 8 is a conceptual diagram illustrating an example of a translation system.

FIG. 8 is a conceptual diagram illustrating an example 800 of a translation system. The translation system can provide translations in all the languages supported by the platform 804. If the platform 804 is delegated to source missing translations it can optionally do so. If translations are not available for a specified language, the platform 804 can default to a default language such as "US-English" values. Data 802 (e.g., text, product or service information, etc.) is transmitted to the platform 804 through the enterprise gateway 806 into the translations data object 812 by pipeline job 810. The enterprise gateway 806 can retrieve translations hosted in enterprise systems in platform 804 through designated channels. The enterprise gateway 806 can perform synchronicity of data in the platform 804 with the upstream systems. The platform 804 services can consume translation data hosted in the platform 804 using a method such as data API 820 or subscribe to translation data CRUD events and maintain translations locally within the consumption domain. The translations data object 812 receives data from the pipeline job 810 and 824. The data API 820 can transmit the data to the domain services 816, the API gateway 818 and/or the translation catalog manager 822. The translation catalog manager 822 (e.g., platform service) can maintain a catalog of translations. The catalog can include all translation sources. The translation catalog manager 822 can provide provision to scope items to specific namespaces, such as an API that needs to define translations that are uniquely specific to its domain so that it does not conflict with other translations in the catalog. The translation catalog manager 822 can identify items in the catalog that require translation and initiate a request to the translation provider 826. This process can be designed as an ongoing recurring process, which incrementally identifies new items in the catalog to translate. The translation catalog manager 822 can merge the response from translation provider 826 to the translation master data. The translation provider 826 can be a company translation team or a third-party provider that translates content.

The translation data event stream 814 can transmit data to the domain services 816 and the domain services can send the data to the API gateway 818. The API gateway 818 can manage and develop APIs and send data to the consuming applications 828. The translation provider 826 can exchange data with the translation catalog manager 822 and the consuming applications 828. The consuming applications 828 can consume translation data hosted in the platform 804 using Data API 820. The consuming applications 828 can optionally source translations directly from the translation provider 826 and host it privately within its scope (e.g., stored in the form of resource bundles).

INDUSTRIAL APPLICABILITY

The systems and methods described herein can translate product or service information into any language. Translating the product or service information (e.g., equipment part names, equipment part descriptions, equipment names, technical documents, manuals, etc.) allows users to correctly select and receive products or services (e.g., equipment part items) even when ordering the products or services in a different language. The present systems and methods can be implemented to translate information associated with industrial machines, vehicles and/or other suitable devices such as mining machines, trucks, corporate fleets, etc.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for translating equipment part item names, the method comprising:
   training a machine-learning translation model based on at least one dataset of translated item names;
   receiving, by the trained machine-learning translation model via a user interface, a request for at least one equipment part item, wherein the request is in a dialect of the user interface;
   identifying, by the trained machine-learning translation model, a localized version of the dialect based on geolocation data associated with the request;
   filtering, by the trained machine-learning translation model, equipment part items in an equipment part platform based on the localized version of the dialect by:
      translating names of one or more equipment part items in the equipment part platform into the localized version of the dialect;
      determining first function criteria of the one or more equipment part items in the equipment part platform and second function criteria of the at least one equipment part item from the request;
      identifying one or more equipment part item translations as results for the request based on a match between the first function criteria of the one or more equipment part items in the equipment part platform and the second function criteria of the at least one equipment part item from the request;
   outputting, to the user interface, a notification of the identified one or more equipment part item translations including an equipment part number; and
   receiving, from the user interface, feedback regarding an accuracy of the equipment part number in relation to the at least one equipment part item from the request.

2. The method of claim 1, further comprising:
   exporting the one or more equipment part items in the equipment part platform based on the request.

3. The method of claim 1, further comprising:
   defining a translation of each equipment part item of the one or more equipment part items in the equipment part platform for each localized version of each dialect.

4. The method of claim 1, further comprising:
   receiving new equipment part items added to the equipment part platform; and
   creating a localization version of the added new equipment part items for each dialect in the equipment part platform.

5. The method of claim 1, further comprises:
   performing a search to identify untranslated equipment part items in the equipment part platform;
   identifying the untranslated equipment part items in the equipment part platform; and
   creating a localization version of the untranslated equipment part items for each dialect in the equipment part platform.

6. The method of claim 1, further comprising:
   defining translations for the equipment part items in the equipment part platform that are specific to a domain in the equipment part platform.

7. The method of claim 1, wherein a user verifies the localized version of the dialect in the user interface.

8. A computing system for translating equipment part item names, the computing system comprising:
   one or more processors; and
   one or more memories storing instructions that, when executed by the one or more processors, cause the computing system to perform a process comprising:
      training a machine-learning translation model based on at least one dataset of translated item names;
      receiving, by the trained machine-learning translation model via a user interface, a request for at least one equipment part item, wherein the request is in a dialect of the user interface;
      identifying, by the trained machine-learning translation model, a localized version of the dialect based on geolocation data associated with the request;
      filtering, by the trained machine-learning translation model, equipment part items in an equipment part platform based on the localized version of the dialect by:
         translating names of one or more equipment part items in the equipment part platform into the localized version of the dialect;
         determining first function criteria of the one or more equipment part items in the equipment part platform and second function criteria of the at least one equipment part item from the request;
         identifying one or more equipment part item translations as results for the request based on a match between the first function criteria of the one or more equipment part items in the equipment part platform and the second function criteria of the at least one equipment part item from the request;
      outputting, to the user interface, a notification of the identified one or more equipment part item translations including an equipment part number; and
      receiving, from the user interface, feedback regarding an accuracy of the equipment part number in relation to the at least one equipment part item from the request.

9. The computing system of claim 8, wherein the process further comprises:
  exporting the one or more equipment part items in the equipment part platform based on the request.

10. The computing system of claim 8, wherein the process further comprises:
  defining a translation of each equipment part item of the one or more equipment part items in the equipment part platform for each localized version of each dialect.

11. The computing system of claim 8, wherein the process further comprises:
  receiving new equipment part items added to the equipment part platform; and
  creating a localization version of the added new equipment part items for each dialect in the equipment part platform.

12. The computing system of claim 8, wherein the process further comprises:
  performing a search to identify untranslated equipment part items in the equipment part platform;
  identifying the untranslated equipment part items in the equipment part platform; and
  creating a localization version of the untranslated equipment part items for each dialect in the equipment part platform.

13. The computing system of claim 8, wherein the process further comprises:
  defining translations for the equipment part items in the equipment part platform that are specific to a domain in the equipment part platform.

14. The computing system of claim 8, wherein a user verifies the localized version of the dialect in the user interface.

15. A non-transitory computer-readable storage medium comprising: a set of instructions that, when executed by at least one processor, causes the at least one processor to perform operations for translating equipment part item names, the operations comprising:
  training a machine-learning translation model based on at least one dataset of translated item names;
  receiving, by the trained machine-learning translation model via a user interface, a request for at least one equipment part item, wherein the request is in a dialect of the user interface;
  identifying, by the trained machine-learning translation model, a localized version of the dialect based on geolocation data associated with the request;
  filtering, by the trained machine-learning translation model, equipment part items in an equipment part platform based on the localized version of the dialect by:
    translating names of one or more equipment part items in the equipment part platform into the localized version of the dialect;
    determining first function criteria of the one or more equipment part items in the equipment part platform and second function criteria of the at least one equipment part item from the request;
    identifying one or more equipment part item translations as results for the request based on a match between the first function criteria of the one or more equipment part items in the equipment part platform and the second function criteria of the at least one equipment part item from the request;
  outputting, to the user interface, a notification of the identified one or more equipment part item translations including an equipment part number; and
  receiving, from the user interface, feedback regarding an accuracy of the equipment part number in relation to the at least one equipment part item from the request.

16. The non-transitory computer-readable storage medium of claim 15, wherein the operations further comprise:
  exporting the one or more equipment part items in the equipment part platform based on the request.

17. The non-transitory computer-readable storage medium of claim 15, wherein the operations further comprise:
  defining a translation of each equipment part item of the one or more equipment part items in the equipment part platform for each localized version of each dialect.

18. The non-transitory computer-readable storage medium of claim 15, wherein the operations further comprise:
  receiving new equipment part items added to the equipment part platform; and
  creating a localization version of the added new equipment part items for each dialect in the equipment part platform.

19. The non-transitory computer-readable storage medium of claim 15, wherein the operations further comprise:
  performing a search to identify untranslated equipment part items in the equipment part platform;
  identifying the untranslated equipment part items in the equipment part platform; and
  creating a localization version of the untranslated equipment part items for each dialect in the equipment part platform.

20. The non-transitory computer-readable storage medium of claim 15, wherein a user verifies the localized version of the dialect in the user interface.

* * * * *